United States Patent Office 2,797,319
Patented June 25, 1957

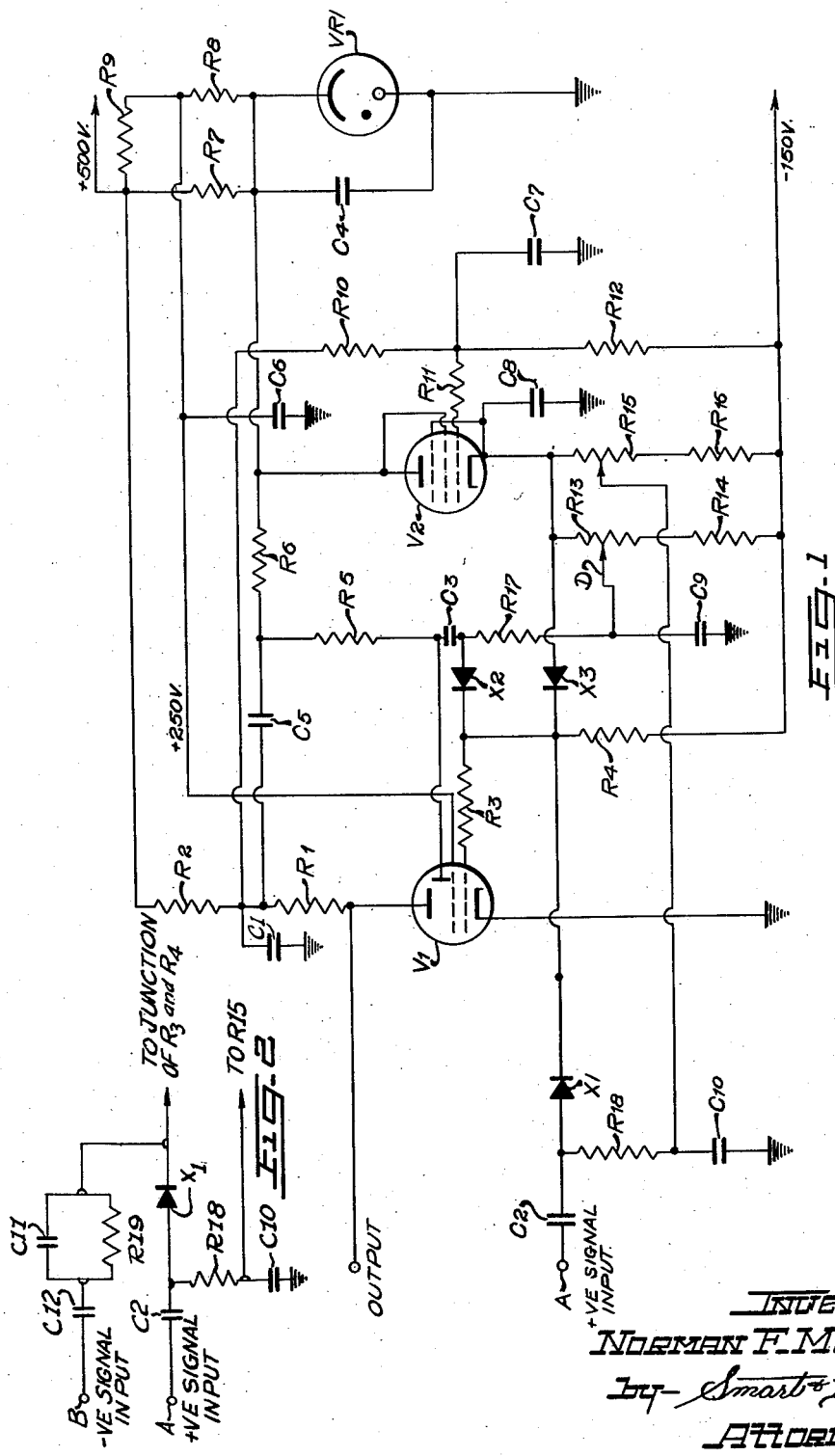

2,797,319

TRIGGER CIRCUIT

Norman F. Moody, London, England, assignor, by mesne assignments, to the United States of America as represented by the United States Atomic Energy Commission Application March 16, 1953, Serial No. 342,562

Claims priority, application Canada April 28, 1952

5 Claims. (Cl. 250—27)

The present invention relates to a trigger circuit and is particularly concerned with a high-speed trigger circuit adapted to function as a discriminator circuit for millimicrosecond work.

The term "trigger circuit," as used in this specification and as is commonly understood in the art, denotes a circuit which can exist in only one or the other of two quasi-stable states and in which transition from one state to the other takes place in a more or less discontinuous manner. Trigger circuits are used in the production of discontinuous or impulsive signals having a definite time relation with an input signal.

Trigger circuits known prior to the present invention have not been as sensitive and stable in operation over a long period of time as is desirable, especially when they are used in millimicrosecond work in which it is important that trigger circuits be sensitive to weak pulses and, in the case of trigger circuits being used to provide discriminator action, that they remain stable in operation without variation of the discrimination level during change in characteristics of a tube due to ageing, or when a tube is replaced by another of slightly different characteristics. It is well known in the art that as a tube ages the relation between its anode current and control grid bias voltage changes so that if the anode current was to be maintained at a predetermined fixed value under given input signal conditions, it was necessary to keep a check on the circuit and to adjust the control grid bias voltage from time to time.

A trigger circuit according to the present invention comprises a tube of the secondary-emission type having a dynode connected through a rectifier to provide positive feedback to the control grid of the tube. The rectifier blocks the positive feedback path when there is no input signal and a suitable control grid bias is supplied so that the tube operates under class A amplifier conditions giving a high triggering sensitivity. Upon an input pulse being received at the control grid the positive feedback path is completed through the rectifier and the triggering process is initiated.

According to a preferred form of the invention, the control grid bias of the secondary-emission type tube is determined automatically by the anode current of the tube so that a predetermined fixed value of anode current is maintained during ageing of the tube. A trigger circuit according to this form of the invention comprises a first tube of the secondary-emission type having a dynode connected through a first rectifier to provide positive feedback to the control grid and a second tube operated as a cathode follower to provide negative feedback through a second rectifier to the control grid of the first tube. The operating conditions of the tubes are set so that under quiescent conditions, positive feedback from the dynode is blocked by the first rectifier and the first tube operates as a class A amplifier giving a high triggering sensitivity. When a positive input signal is applied to the control grid of the first tube, the voltage of the dynode rises overcoming the bias on the first rectifier and providing positive feedback which causes the grid of the first tube to be driven still further in a positive direction, thus initiating the triggering process. Since decoupling condensers at various points in the negative feedback path prevent the cathode of the second tube moving during this process, there is no negative feedback, and in fact the rise of the first tube's grid causes the second rectifier to become nonconducting.

In another preferred form of the invention the trigger circuit is arranged to provide discriminator action in which the level of discrimination is defined by a bias which is obtained in such a way that the discrimination level is independent of tube characteristics. According to this preferred form of the invention the input connection to the trigger circuit is through a third rectifier which is biased by a negative voltage obtained from the cathode load of the second tube thereby setting the level at which discrimination occurs. As the biases required to set the level of discrimination and the triggering sensitivity are both determined relative to the voltage at the cathode of the second tube, which is substantially the same as the quiescent grid bias on the first tube and is automatically varied so as to maintain a constant anode current in the first tube, the level at which discrimination occurs is substantially independent of changes in the characteristics of the tubes.

The invention will be further described with reference to the attached drawing in which Figure 1 shows a schematic circuit diagram of a preferred form of the invention, and Figure 2 shows a modification of the input of the circuit shown in Figure 1.

The trigger circuit shown in Figure 1 of the drawing comprises a first tube V1 of the secondary emission type having a cathode, a control grid, a screen grid, a dynode and an anode, such as the Philips type EFP60 tube which has a high transconductance between the control grid and the dynode, being some 17 milliamperes per volt at 17 milliamperes of dynode current. A shown in the drawing the cathode of the tube V1 is grounded and the anode is connected to a source of +500 volts through series connected resistors R1 and R2. A condenser C1 is connected from the junction point of the resistors R1 and R2 to ground as a decoupling capacity. The control grid of the tube V1 is connected through a resistor R3, a crystal rectifier X1 and a condenser C2 to an input terminal A. A resistor R4 is connected from the connection between the resistor R3 and the rectifier X1 to a source of −150 volts. A second crystal rectifier X2 is connected from the connection between the resistor R3 and the crystal rectifier X1 through a condenser C3 to the dynode of the tube V1. The dynode of the tube V1 is supplied with a positive voltage (approximately +140 volts) through series connected resistors R5 and R6 from a source of regulated voltage which includes a conventional regulating circuit formed by the following elements: a voltage regulating tube VR1, a condenser C4, and resistors R7, R8 and R9. A condenser C5 provides decoupling between the junction of the resistors R1 and R2 in the anode circuit and the junction of the resistors R5 and R6 in the dynode circuit. The screen grid of the tube is supplied with a positive voltage (approximately +250 volts) from the junction of the resistors R8 and R9 in the voltage regulating circuit. A bypass condenser C6 is connected from the screen grid to ground.

The output signal voltage from the tube V1 is supplied from the junction point of the resistors R1 and R2 through series resistors R10 and R11 to the control grid of a second tube V2, which may be a type 6AK5 pentode. The control grid of the tube V2 has a condenser C7 connected to ground and a resistor R12 connected to the source of −150 volts. The anode of the tube V2 is supplied with its operating voltage from the common junction point of the resistors R6, R7 and R8. The screen grid is connected directly to the anode so that the tube in effect operates as a triode. The suppressor grid is connected directly to the cathode and a bypass condenser C8 is connected from the cathode to ground. The cathode circuit of the tube V2 comprises two pairs of series-connected resistors R13, R14 and R15, R16 connected in parallel to the source of —150 volts. These resistors form a cathode load for the tube V2 so that it operates as a cathode follower. The resistor R13 is a potentiometer having a variable tap connected through a resistor R17, the rectifier X2 and the resistor R3 to the control grid of the tube V1. A condenser C9 is connected as a bypass to ground from the variable tap of the potentiometer R13. The resistor R15 is also of the potentiometer type and has a variable tap connected through a resistor R18 to the junction point between the condenser C2 and the rectifier X1 in the input circuit. A condenser C10 is connected from the variable tap of the potentiometer R15 to ground to act as a bypass path. A negative feedback path from the cathode of the tube V2 to the control grid of the tube V1 is formed by the connection through the rectifier X3.

The input terminal A (Figure 1) provides an input for positive going pulses, but if desired, improved performance, as hereinafter explained, can be obtained if push-pull input is applied using the input terminal B (Figure 2) for the negative signal, the input terminal B is connected to the junction between the rectifier X1 and the resistor R3 by a condenser C12 and parallel connected condenser C11 and resistor R19.

An example of suitable values for the various components shown in the circuit is given in the table below for the following approximate performance figures:

| | |
|---|---|
| Stable triggering sensitivity | Better than 0.1 volt for 10 millimicrosecond pulses. |
| Triggering delay | 3 to 10 millimicroseconds depending on pulse shape and drive conditions. |
| Output pulse | 200 to 300 milliamperes (16 volts across 75 ohms). |
| Pulse duration | 0.3 microsecond. |
| Tube: | |
| V1 | Philips type EFP60. |
| V2 | Type 6AK5. |
| VR1 | Type VR105. |
| Rectifiers X1, X2 and X3 | Germanium crystals. |
| Condensers: | |
| C1 | 0.5 mfd. |
| C2 | 1,000 mmfd. |
| C3 | 100 mmfd. |
| C4 and C6 | 0.1 mfd. |
| C5 | 2 mfd. |
| C7, C9 and C10 | 0.01 mfd. |
| C8 | 1 mfd. |
| C11 | About 1 mmfd. (equal to capacitance across anode to cathode of X1). |
| C12 | 1,000 mmfd. |
| Resistors: | |
| R1 | 75 ohms. |
| R2 | 6,800 ohms. |
| R3 | 10 ohms. |
| R4 | 100,000 ohms. |
| R5, R6 and R17 | 1,000 ohms. |
| R7 | 82,000 ohms. |
| R8 | 33,000 ohms. |
| R9 | 47,000 ohms. |
| R10 | 330,000 ohms. |
| R11 and R15 | 10,000 ohms. |
| R12 | 140,000 ohms. |
| R13 | 2,500 ohms. |
| R14 | 57,000 ohms. |
| R16 | 50,000 ohms. |
| R18 | 5,000 ohms. |
| R19 | Equal to reverse resistance of rectifier X1, very approximately 100,000 ohms. |

It is to be noted that other values for the components may be selected in accordance with conventional design practice to suit other performance figures.

In order to set the desired quiescent conditions in the tube V1, the resistance R2 is made to produce a voltage drop of 144 volts by negative feedback applied to the control grid of the tube V1, via the resistors R10, R12 and the cathode follower tube V2. The control grid of the tube V1 tends to have a voltage of —150 volts due to its connection to the source of —150 volts through the resistor R4, but is restrained at the cathode potential of the tube V2 by the rectifier X3. The prime purpose of the tube V2 is to provide a low impedance grid reference potential to aid in rapid recovery of quiescent conditions after firing of the trigger circuit by an input pulse. Bias for the rectifier X2, which sets the triggering sensitivity, is obtained from a portion of the cathode load of the tube V2 at the point D in the cathode circuit of the tube V2 and so is substantially independent of the exact control grid voltage demanded by the tube V1. Since the dynode transconductance is of the order of 17.5 ma./v., working into an A. C. load of some 500 ohms, the potential loop gain starts at 8.5 but the ratio of the capacitance from anode to cathode of X2 to the capacitance from control grid to gorund of V1 gives sufficient attenuation (about 16:1) to ensure stability in the quiescent state. Assuming the rectifier X2 to be biased off by 1 volt, then, from the dynode gain quoted, a positive signal applied to the control grid of amplitude slightly in excess of 0.1 volt will cause loop closure and reflexing will ensue. A stable triggering sensitivity several times better than this figure can be achieved by further reduction of the loop bias.

On receipt of the triggering pulse the dynode of the tube V1 rises in voltage, closes the loop, and generates a saturation current (space charge limited) in the dynode-anode region. This dynode current of some 30 ma. results in a voltage rise of about 30 volts at the electrode and also at the control grid, thereby causing grid current in the latter. At this time the primary current generated by the triode section is some 215 ma. and so is far in excess of the value needed to maintain the saturated dynode current. During the semi-stable state both the control grid and the cathode currents diminish substantially, but until the primary current has fallen to about 50 ma. the dynode current changes only by some 10%. The loop gain is therefore less than unity and the relaxation is maintained.

Recovery ensues when the primary current is insufficient to maintain dynode saturation, whereupon the control grid of the tube V1 reassumes control, the loop gain rises, and re-triggering occurs. Since the retrip action takes place before the control grid current has ceased, the rectifier X2 is conductive as the reflexing begins, but completion of the action presumably depends on its self-capacity in the presence of the high loop gain then existing.

The anode current does not display the same constancy as that of the dynode, but its variation by a factor of two is much less than the primary current changes. It is assumed that the anode collects a proportion of the primary stream directly, but this ratio is dependent both on the dynode-anode voltages and primary current at any instant.

Addition of the rectifier X1, with the input signals applied at the input terminal A, converts the trigger circuit into a discriminator circuit for high-speed pulses. A discriminator bias of 0–25 volts is tapped from the potentiometer R15 in the cathode circuit of the tube V2 and thereby the control grid potential of the tube V1 is again the zero reference level.

The capacitance of the rectifier X1 will produce a current proportional to input wavefront rate, so causing an error, though this component (and possible reverse D. C. current in the rectifier X1 is minimized by the 1.5 ma. bleed of current through the resistor R4 which clamps the control grid of the tube V1 via the low impedance of the rectifier X3. Further reduction of capacity breakthrough is possible if the signal exists in the preferred push-pull form, for then the negative waveform may be applied to terminal B (Figure 2) and so a compensating current is injected through the network shown in dotted line, which is arranged to match the non-conducting characteristic of the rectifier X1.

What I claim as my invention is:

1. A trigger circuit comprising an electronic vacuum tube having at least a cathode, a control grid, a dynode and an anode; an input circuit for supplying positive input pulses at said control grid; feedback connection from said dynode to said control grid; rectifying means series-connected in said feedback connection and arranged to conduct current toward said control grid; a source of a first bias voltage connected to said control grid; a source of a second bias voltage connected to said rectifying means; said sources of the first and second biases being adapted to allow said tube to operate as a class A amplifier with said rectifying means biased in the non-conducting direction by a predetermined voltage.

2. A trigger circuit, comprising a first electronic vacuum tube having at least a cathode, a control grid, a dynode and an anode; an input circuit for supplying positive input pulses at said control grid; a first feedback connection from said dynode to said control grid; a first rectifying means series connected in the first feedback connection and arranged to conduct current toward said control grid; a source of a first bias voltage connected to said control grid; a source of a second bias voltage connected to said rectifying means; said sources of the first and second biases being adapted to allow said tube to operate as a class A amplifier with said rectifying means biased in the non-conducting direction by a predetermined voltage; a second electronic vacuum tube having at least a cathode, a control grid and an anode; a direct current connection from the anode of the first tube to the control grid of the second tube for supplying at least a portion of the output voltage of said first tube as an input voltage to said second tube; a cathode load for the second tube; a second feedback connection from the cathode of the second tube to the control grid of the first tube; rectifying means series-connected in said second feedback connection and arranged to conduct current toward the control grid of the first tube; a direct current connection for supplying said second bias voltage from a portion of said cathode load of the second tube to the side of said first rectifying means which is connected to said dynode; and means for supplying operating voltages to the first and second tubes.

3. A trigger circuit as defined in claim 2 comprising, a third rectifying means series-connected in the input circuit for supplying the input pulses to the control grid of the first tube, the third rectifying means being arranged to conduct current toward said control grid; and a direct current connection from a portion of the cathode load of the second tube to the side of the third rectifying means which is connected to the input connection of the trigger circuit.

4. A trigger circuit as defined in claim 3 in which the cathode load of the second tube includes two parallel-connected potentiometers, one of said potentiometers having a variable tap connection for providing the direct current connection from a portion of said cathode load to the side of the first rectifying means, and the other of said potentiometers having a variable tap connection for providing the direct current connection from a portion of said cathode load to the side of the third rectifying means.

5. A trigger circuit as defined in claim 2 in which the cathode load of the second tube includes a potentiometer having a variable tap connection for providing the direct current connection from a portion of said cathode load to the side of the first rectifying means.

References Cited in the file of this patent
UNITED STATES PATENTS

| | | |
|---|---|---|
| 2,168,165 | Koller et al. | Aug. 1, 1939 |
| 2,274,369 | Janssen | Feb. 24, 1942 |
| 2,293,177 | Skellett | Aug. 18, 1942 |
| 2,416,355 | Skellett | Feb. 25, 1947 |
| 2,509,998 | Van der Mark et al. | May 30, 1950 |
| 2,631,233 | Steinberg | Mar. 10, 1953 |